May 3, 1960 R. J. MUELLER 2,935,236
DISPENSING LIQUIDS
Filed Jan. 11, 1957

INVENTOR:
RICHARD J. MUELLER
BY Mergall, Johnston,
Cook & Root
ATT'YS

United States Patent Office 2,935,236
Patented May 3, 1960

2,935,236

DISPENSING LIQUIDS

Richard J. Mueller, Franklin Park, Ill., assignor to Automatic Canteen Company of America, Inc., Chicago, Ill., a corporation of Delaware Application January 11, 1957, Serial No. 633,798

12 Claims. (Cl. 222—425)

This invention, in general, relates to methods and apparatus for dispensing a uniform amount of liquid. More particularly, the invention relates to methods and apparatus for dispensing a liquid under a substantially uniform, average head during a given dispensing time interval.

In vending machines and the like for dispensing into a container a liquid such as coffee, broth, milk, fruit juices, and other similar beverages, the valve in the dispensing line is opened for a set interval. The amount of liquid discharged during this time is subject to variation—depending on the pressure exerted by the liquid head in the storage vessel. For example, in many of the known liquid vending machines, the liquid is discharged from the storage vessel directly into the dispensing line. As the liquid is exhausted in said vessel, the level falls and hence the fluid pressure decreases. Noticeable variations in the amount of liquid dispensed during the set dispensing interval occur when the storage chamber is full as compared to the case when the storage chamber is at a low liquid level.

The apparatus of this invention relates primarily to means for providing a substantially uniform average head in the liquid being dispensed during the set dispensing interval regardless of the liquid level in the storage chamber. The invention provides uncomplicated means to overcome the foregoing prior art difficulties.

It is an object of the present invention to provide methods and apparatus for dispensing a substantially uniform quantity of liquid in a given time interval. Another object is to provide methods and apparatus for providing a substantially uniform, average head for the liquid being dispensed from a storage chamber during a given time interval, irrespective of the liquid level in said storage chamber. Other objects will appear hereinafter.

An embodiment of the invention is illustrated in the drawing wherein.

Figure 1:
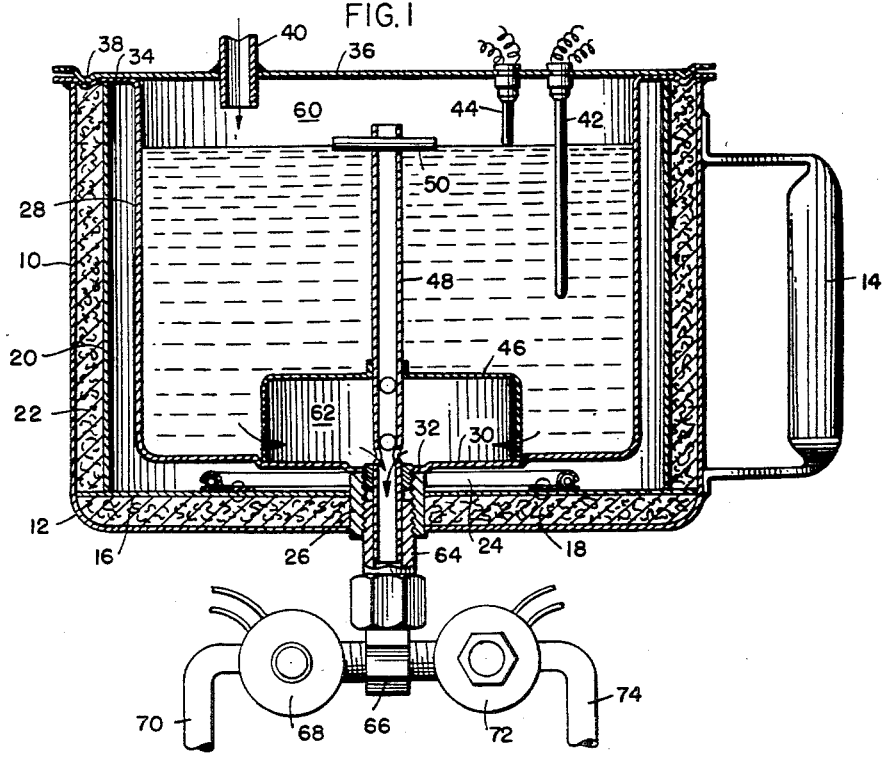
Fig. 1 is a side elevation in cross-section of the embodiment.
Figure 2:
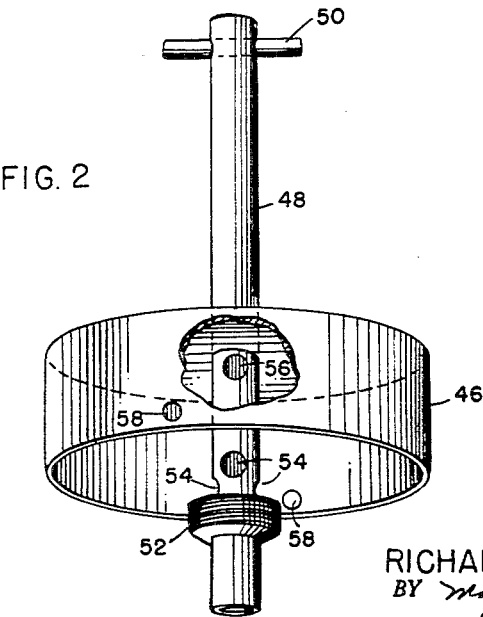
Fig. 2 is a perspective view, with a portion broken away for greater clarity of detail, of a portion of the apparatus illustrated in Fig. 1.

Broadly speaking, the invention relates to methods and apparatus for providing a substantially uniform, average head on the liquid being dispensed during a given dispensing interval. A substantially uniform, average head is achieved by providing a vented dispensing chamber between the storage chamber and the dispensing line. The rate of admission of liquid to the dispensing chamber from the storage chamber is materially less than the rate of discharge from the dispensing chamber so that the liquid head in the storage chamber does not affect to any substantial degree the head of the liquid in the dispensing chamber during the dispensing time interval.

Referring now to the drawings, a storage and discharge vessel is designated generally at 10. This vessel comprises an outer cup 12 having a handle 14, an inner bottom wall 16 spaced from the bottom of the cup, insulation 18 between the bottom wall 16 and the bottom of the cup, inner peripheral wall 20 spaced from the sides of the cup, and insulation 22 therebetween. A heating element 24 is secured to bottom wall 16 in the case where the beverage being dispensed is a hot coffee, soup or broth.

A threaded sleeve 26 is soldered on a storage vessel 28 to provide a liquid-tight seal and extends through the bottom wall of the cup 12 and bottom wall 16. The bottom of the storage vessel 28 has a depressed portion 30 and a further depressed central portion 32 having a threaded aperture therein. The rim of the storage vessel 28 has a peripheral flanged portion 34. A lid 36 covers the storage vessel 28. The lid 36 is bent to provide a peripheral tongue 38 for seating in a corresponding groove in the flange 34 of the storage vessel 28. A liquid feed pipe 40 extends through and is secured to the lid 36. The lid 36 also has mounted therein a level control electrode 42 which actuates a relay which, in turn, starts a coffee brewer or other liquid supply when the liquid level in the storage vessel 28 drops below the bottom of the electrode. In the embodiment illustrated, the liquid feed through feed pipe 40 is cut off by a timer mechanism adjusted to supply a given quantity of liquid to the storage vessel 28. The second electrode 44 is provided as a safety device to cut off liquid supplied through the feed pipe 40 in the event the timer mechanism fails to function.

The storage vessel 28 has therein a cylinder 46 closed at one end and seated in depressed portion 30—thereby dividing said storage vessel into two chambers, 60 and 62. The cylinder 46 is mounted securely on a central tube 48. The tube 48 extends above the highest liquid level in the storage vessel 28, and the upper portion thereof serves as an air vent for the chamber 62, as will be described in more detail hereinafter. The tube 48 has extending therethrough near the upper end a handle 50. Near the opposite end of the tube 48 is an enlarged threaded portion 52 securely mounted about the tube 48.

The tube 48 has discharge apertures or orifices 54 located near the bottom of the discharge chamber 62. Apertures 56 in the tube 48 located near the top of the discharge chamber 62 serve as discharge orifices for the chamber 62 when it is full, but their primary function is to provide an air vent at the top of the chamber 62. The cross-sectional area and volume of that portion of vent tube above chamber 62 should be relatively small to reduce portion variation caused by decreasing quantity of liquid in this tube as level of liquid in vessel 28 decreases. The cylinder 46 has small apertures 58 in the side wall for admission of liquid from the storage chamber 60 into the discharge chamber 62. The apertures 58 should be small enough to provide a substantial pressure drop thereacross during fluid flow. The total area of the apertures 54 with relation to the smallest effective area constricting liquid flow from the chamber 62 is critical with reference to the maintenance of a substantially uniform, average head during the discharge interval. The smaller of the total area of the apertures 54, the smallest cross-section of the discharge line, and the cross-sectional area of the tube 48 should be substantially greater than the total area of the apertures 58 so that the rate of discharge of the chamber 62 is substantially greater than the rate of admission of liquid from the storage chamber 60 into the discharge chamber 62. The ratio of the smallest effective area constricting liquid flow from the chamber 62 to the total area of the admission apertures 58 should be at least about 2.5:1, respectively. In the embodiment illustrated, the cross-sectional area of the tube 48 is smaller than the cross-sectional area of the discharge line 74 and the total area of the apertures 54. Thus, the tube 48 provides, in the embodiment illustrated, the smallest effective area constricting liquid flow during discharge. The same results can be achieved wherein the cross-sectional area of the discharge line 74 or the total area of apertures 58 is the smallest effective area. In vending machines for dispensing liquids such as coffee, a ratio in the range of about 2.5:1 to 3:1 is satisfactory. Preferably, the liquid in the storage chamber 60 is admitted into the discharge chamber 62 at a rate sufficient to keep the liquid level in the chamber 62 high enough to avoid swirling, which occurs when the chamber 62 is nearly exhausted.

The volume capacity of the discharge chamber 62 is preferably of a size slightly larger than the volume of liquid to be dispensed into a receiving container such as a paper cup. For example, in dispensing approximately 6 ounces the chamber capacity is preferably about 8 ounces.

The lower end of the tube 48 extends into externally-threaded nipple 64 having a T connection 66. A drain valve 68 and drain line 70 are connected on one side of the T. A solenoid dispenser valve 72 and discharge line 74 are connected on the other side of the T.

The process of the present invention, broadly speaking, comprises filling the storage and discharge vessel to a level such as is shown in Fig. 1. Discharge chamber 62 fills with liquid through apertures 58 and the central tube 48 also fills with liquid to a level equal to that in the storage chamber 60. When the solenoid valve 72 is opened for a set time interval, the liquid drains from the discharge chamber 62 into the lower portion of the tube 48 and thence through the open solenoid valve 72 and discharge line 74. Air enters the discharge chamber 62, to permit its evacuation, through the upper part of the tube 48 and thence through the air vents 56. A relatively small quantity of liquid compared to the volume discharged enters the discharge chamber 62 through apertures 58 by gravitational flow during the discharge cycle. Thus, a substantially uniform, average head is maintained during the discharge interval, all the liquid being discharged from the chamber 62. The pressure head provided by the liquid in the storage chamber 60 has only a slight effect on the average head of the liquid in the discharge chamber 62 because there is a relatively high pressure drop as the liquid passes through the small apertures 58 in the discharge chamber 62. Thus, the average head in the liquid being discharged from the chamber 62 is substantially independent of the liquid level in the storage chamber 60.

At the end of the dispensing time interval the solenoid valve 72 closes, and the discharge chamber 62 and tube 64 fill with liquid from the storage chamber 60 by gravitational flow via apertures 58. The apparatus is then ready for another dispensing cycle.

The invention herein described is not specifically limited to the embodiment illustrated in the drawing. Many modifications will occur to those skilled in the art once the principles herein taught are understood. For example, the storage vessel 28 may be divided into upper and lower segments, with small apertures such as those shown at 58 and a vent tube being provided in a wall which divides the storage vessel into an upper storage chamber and a lower discharge chamber. Further, the discharge chamber 62 does not have to be mounted inside the storage chamber 60. The discharge chamber 62 may be an entirely separate chamber located below or to one side of the storage chamber, the two being connected by a conduit having a relatively small opening or openings corresponding to the apertures 58 of the embodiment illustrated. Also, the apertures 58 in the cylinder need not necessarily be in the side wall, but may be in another wall, if desired. Other modifications utilizing the principles herein taught will occur to those skilled in the art.

The invention is hereby claimed as follows:

1. Apparatus for dispensing a liquid under a substantially uniform average head in a given dispensing interval which comprises: a storage chamber; a dispensing chamber; means for continuously communicating said storage chamber and said dispensing chamber and providing for gravitational flow of a liquid from said storage chamber into said dispensing chamber whenever a pressure differential exists between said chambers; means for discharging said liquid from said dispensing chamber at a materially greater volume rate than the volume rate of flow through said first-mentioned means during the discharge interval; and an air vent tube extending upwardly from said dispensing chamber above the highest liquid level in said storage chamber, said tube having a venting opening providing communication of the interior of said tube with the atmosphere and also having means providing communication between the upper portion of said dispensing chamber and the interior of said tube to thereby vent said dispensing chamber with the atmosphere, whereby, at static equilibrium between said storage chamber and said dispensing chamber, said dispensing chamber is filled with said liquid and said air vent tube is filled with said liquid to a height equal to the liquid height in said storage chamber.

2. Apparatus for dispensing a liquid under a substantially uniform average head in a given dispensing interval which comprises: a storage chamber; a dispensing chamber; means for continuously communicating said storage chamber and said dispensing chamber and providing for flow of a liquid from said storage chamber into said dispensing chamber at a high pressure drop across said means whenever a pressure differential exists between said chambers; means for discharging said liquid from said dispensing chamber at a materially greater volume rate than the volume rate of flow through said first-mentioned means during the discharge interval; and an air vent tube extending upwardly from said dispensing chamber above the highest liquid level in said storage chamber, said tube having a venting opening providing communication of the interior of said tube with the atmosphere and also having means providing communication between the upper portion of said dispensing chamber and the interior of said tube to thereby vent said dispensing chamber with the atmosphere, whereby, at static equilibrium between said storage chamber and said dispensing chamber, said dispensing chamber is filled with said liquid and said air vent tube is filled with said liquid to a height equal to the liquid height in said storage chamber.

3. Apparatus for dispensing a substantially uniform volume of liquid during a given time interval which comprises: a storage chamber; a dispensing chamber; continuously open passage means for communicating said storage chamber and said dispensing chamber and providing for gravitational flow of a liquid from said storage chamber into said dispensing chamber while liquid is being discharged from said dispensing chamber; an air vent tube extending upwardly from said dispensing chamber above the highest liquid level in said storage chamber, said tube having a venting opening providing communication of the interior of said tube with the atmosphere and also having means providing communication between the upper portion of said dispensing chamber and the interior of said tube to thereby vent said dispensing chamber with the atmosphere, whereby, at static equilibrium between said storage chamber and said dispensing chamber, said dispensing chamber is filled with said liquid and said air vent tube is filled with said liquid to a height equal to the liquid height in said storage chamber; and means for discharging said liquid from said dispensing chamber at a materially greater volume rate than the volume rate of flow through said first-mentioned means during the discharge interval, the ratio of the smallest effective area constricting fluid flow during the discharge interval through said second-mentioned means to the total effective area of said first-mentioned means being at least about 2.5:1, respectively.

4. Apparatus for dispensing a substantially uniform volume of liquid during a given time interval which comprises: a storage chamber; a dispensing chamber; fluid passage means for continuously communicating said storage chamber and said dispensing chamber and providing for gravitational flow of a liquid from said storage chamber into said dispensing chamber whenever a pressure differential exists between said chambers; and means for discharging said liquid from said dispensing chamber at a materially greater volume rate than the volume rate of flow through said first-mentioned means during the discharge interval, the ratio of the smallest effective area constricting fluid flow during the discharge interval through said second-mentioned means to the total effective area of said fluid passage means being at least about 2.5:1, respectively.

5. Apparatus for dispensing a substantially uniform volume of liquid during a given time interval which comprises: a storage chamber; a dispensing chamber; means for continuously communicating said storage chamber and said dispensing chamber and providing for flow of a liquid from said storage chamber into said dispensing chamber at a high pressure drop across said means whenever a pressure differential exists between said chambers; means for discharging said liquid from said dispensing chamber at a materially greater volume rate than the volume rate of flow through said first-mentioned means during the discharge interval; and an air vent tube extending upwardly from said dispensing chamber above the highest liquid level in said storage chamber, said tube having a venting opening providing communication of the interior of said tube with the atmosphere and also having means providing communication between the upper portion of said dispensing chamber and the interior of said tube to thereby vent said dispensing chamber with the atmosphere, whereby, at static equilibrium between said storage chamber and said dispensing chamber, said dispensing chamber is filled with said liquid and said air vent tube is filled with said liquid to a height equal to the liquid height in said storage chamber, the ratio of the smallest effective area constricting fluid flow during the discharge interval through the second-mentioned means to the total effective area of said first-mentioned means being at least about 2.5:1, respectively.

6. Apparatus for dispensing a substantially uniform volume of liquid during a given time interval which comprises: a vessel for liquids, said vessel having an upper storage chamber and a lower discharge chamber; fluid passage means continuously communicating said chambers to provide for gravitational flow of a liquid from said storage chamber into said discharge chamber at a substantial pressure drop across said passage means; means for discharging said liquid from said discharge chamber, the ratio of the smallest effective area constricting liquid flow in said second-mentioned means to total area of said passage means being at least 2.5:1, respectively; and an air vent tube extending upwardly from said discharge chamber into said storage chamber to a height above the highest liquid level in said storage chamber, said tube having a venting opening providing communication of the interior of said tube with the atmosphere and also having means providing communication between the upper portion of said discharge chamber and the interior of said tube to thereby vent said discharge chamber with the atmosphere, whereby, at static equilibrium between said storage chamber and said discharge chamber, said discharge chamber is filled with said liquid and said air vent tube is filled with said liquid to a height equal to the liquid height in said storage chamber.

7. Apparatus for dispensing a substantially uniform volume of liquid during a given time interval which comprises: a vessel adapted to hold a liquid, said vessel having an upper storage chamber and a lower discharge chamber; said discharge chamber having apertures continuously communicating said chambers to provide for gravitational flow of said liquid from said storage chamber into said discharge chamber; an open-ended tube extending through said discharge chamber a substantial distance into said storage chamber; said tube having an air venting aperture communicating the interior of said tube and the upper portion of said discharge chamber and also having liquid-discharging apertures near the bottom of said discharge chamber; the ratio of the smallest effective area constricting liquid flow from said discharge chamber through said tube to the total area of said apertures communicating said chambers being at least about 2.5:1, respectively.

8. Apparatus for dispensing a substantially uniform volume of liquid during a given time interval which comprises: a liquid storage chamber; a cylindrical discharge chamber centrally disposed in said storage chamber at the bottom of said storage chamber; the discharge chamber having apertures continuously communicating said chambers to provide for gravitational flow of said liquid from said storage chamber into said discharge chamber; a central, vertical, open-ended tube extending through said discharge chamber a substantial distance into said storage chamber; said tube having an air venting aperture communicating the interior of said tube and the upper portion of said discharge chamber and also having liquid discharging apertures near the bottom of said discharge chamber; the ratio of the smallest effective area constricting liquid flow from said discharge chamber through said tube to the total area of said apertures communicating said chambers being at least about 2.5:1, respectively.

9. In a machine for vending liquids, a liquid dispensing line; an electrically-controlled valve in said dispensing line adapted to be opened for a set time interval; a vessel for liquids, said vessel having an upper storage chamber and a lower discharge chamber; continuously open aperture means communicating said chambers to provide for gravitational flow of a liquid from said storage chamber into said discharge chamber at a substantial pressure drop across said aperture means; means for discharging a liquid from said discharge chamber, the ratio of the smallest effective area constricting liquid flow in said second-mentioned means to total area of said first-mentioned aperture means being at least 2.5:1, respectively; and an air vent tube communicating with the upper portion of said dispensing chamber and extending above the highest liquid level in said storage chamber to continuously communicate the upper end of said tube with the atmosphere above the liquid in said storage chamber, whereby, at equilibrium between said storage chamber and said dispensing chamber, said dispensing chamber is filled with the liquid and said air vent tube is filled with liquid to a height equal to the liquid height in said storage chamber.

10. Apparatus for dispensing a substantially uniform volume of liquid during a given time interval which comprises: a liquid storage chamber having a bottom wall with a discharge opening in said bottom wall; an air venting tube removably mounted in said bottom wall and extending upwardly from the bottom wall to a height above the highest liquid level in said storage chamber; a hollow, cup-shaped member secured to and about said tube intermediate the ends thereof with the peripheral edge thereof in contact with said bottom wall when the tube is mounted in said bottom wall to form a discharge chamber within said storage chamber; said member having apertures in a wall thereof communicating said discharge chamber with said storage chamber to provide for gravitational flow of a liquid from said storage chamber into said discharge chamber; said tube having an air-venting aperture at a point inside and near the top of said discharge chamber and liquid-discharging apertures near the bottom of said discharge chamber.

11. Apparatus for dispensing a substantially uniform volume of liquid during a given time interval which comprises: a liquid storage chamber having a bottom wall with a discharge opening in said bottom wall; an air venting tube removably mounted in said bottom wall and extending upwardly from the bottom wall to a height above the highest liquid level in said storage chamber; a hollow, cup-shaped member secured to and about said tube intermediate the ends thereof with the peripheral edge thereof in contact with said bottom wall when the tube is mounted in said bottom wall to form a discharge chamber within said storage chamber; said member having continuously open apertures in a wall thereof communicating said discharge chamber with said storage chamber to provide for gravitational flow of a liquid from said storage chamber into said discharge chamber; said tube having an air-venting aperture at a point inside and near the top of said discharge chamber and liquid-discharging apertures near the bottom of said discharge chamber.

12. Apparatus for dispensing a substantially uniform volume of liquid during a given time interval which comprises: a liquid storage chamber having a bottom wall with a discharge opening in said bottom wall; an air venting tube removably mounted in said bottom wall and extending upwardly from the bottom wall to a height above the highest liquid level in said storage chamber; a hollow, cup-shaped member secured to and about said tube intermediate the ends thereof with the peripheral edge thereof in contact with said bottom wall when the tube is mounted in said bottom wall to form a discharge chamber within said storage chamber; said member having continuously open apertures in a wall thereof communicating said discharge chamber with said storage chamber to provide for gravitational flow of a liquid from said storage chamber into said discharge chamber; said tube having an air-venting aperture at a point inside and near the top of said discharge chamber and liquid-discharging apertures near the bottom of said discharge chamber; the ratio of the smallest effective area constricting fluid flow from said discharge chamber through said tube to the total area of said apertures communicating said chambers being at least 2.5:1, respectively.

References Cited in the file of this patent

UNITED STATES PATENTS

| | | |
|---|---|---|
| 376,254 | Nye | Jan. 10, 1888 |
| 2,606,690 | Hansen | Aug. 12, 1952 |
| 2,830,737 | Brown | Apr. 15, 1958 |